350-96.1 SR T
XR 3,102,203

SEARCH ROOM

SUBSTITUTE FOR MISSING XR

Aug. 27, 1963 J. T. McNANEY 3,102,203

PHOTOSENSITIVE DATA PROVIDING SYSTEM

Filed April 15, 1960 3 Sheets-Sheet 1

INVENTOR.
JOSEPH T. MC NANEY
BY Sidney Magnes

Aug. 27, 1963 J. T. McNANEY 3,102,203

PHOTOSENSITIVE DATA PROVIDING SYSTEM

Filed April 15, 1960

3 Sheets-Sheet 2

INVENTOR.
JOSEPH T. MCNANEY

BY Sidney Magnes

INVENTOR.
JOSEPH T. McNANEY
BY Sidney Magnes

United States Patent Office 3,102,203

Patented Aug. 27, 1963

3,102,203

PHOTOSENSITIVE DATA PROVIDING SYSTEM

Joseph T. McNaney, La Mesa, Calif., assignor to General Dynamics Corporation, Rochester, N.Y., a corporation of Delaware Filed Apr. 15, 1960, Ser. No. 22,635
2 Claims. (Cl. 250—209)

This invention relates to a data-providing system—and more particularly to one that (1) decodes messages to provide the corresponding information; (2) retrieves stored information and provides it in the form of complete characters, waveforms, or bits of information that can be assembled and used by a utilization device; or (3) provides data in the form of light modulation or electrical recordation.

There are many needs for data-providing systems. For example, one type is needed by firms—such as newspapers, stock brokers, etc.—who receive much of their data in the form of coded electrical signals. Apparatus is needed to convert these signals to a visible message or evaluation.

Other types of data-providing systems are needed by apparatus whose operation depends on its "memory." For example, when apparatus that translates a foreign language into English is presented with a foreign word and commanded to translate it, the apparatus "searches" its memory, and a data-providing system provides the corresponding English word. Similar searching and data-providing processes occur in computers.

In data-providing systems, several characteristics are particularly important. The first is that the "stored," or memorized data be readily available. This becomes quite a problem when a great deal of data is stored. For example, when the data is stored on a drum, or a reel of tape, film, or wire, the search starts at one end of the reel—and goes through it until the desired information is found. The reel must then be rewound to be ready for another search. It would be preferable that the desired information is immediately available without searching the complete memory system, and that the apparatus be available for other commands as soon as it has provided the desired information. This preferred type of searching is known as providing "random access" to the stored data.

Another desired characteristic of a data-providing system is that as much information as possible be made available on a single command. Since most memory systems produce only a "yes" or a "no" answer, the search makes available only a single "bit" of information. Several commands must therefore be issued, and the resultant bits of information must then be consolidated to provide the desired information.

A further characteristic of importance is simplicity and minimal size. Most present day data-providing apparatus is extremely complex, and requires a great deal of space.

It is apparent that there is a great need for a data-providing system that is simple, small, provides random access to the stored data, and provides composite outputs on a single command.

It is therefore the principal object of my invention to provide an improved data-providing system.

The attainment of this object and others will be realized from the following specification taken in conjunction with the drawings of which:

Broadly speaking, my invention contemplates the use of input signals to energize selected actuators, which thereupon cause light to traverse pickup devices that produce an output signal in the form of light or electricity.

It is well known that elements—lights, dots, apertures, etc.—can be alined to form characters such as letters, numbers, symbols, etc. One arrangement, known as a 5 x 7 matrix, has five rows of seven elements; the elements being selectively energized to form desired characters.

Figures 1, 2, 3:
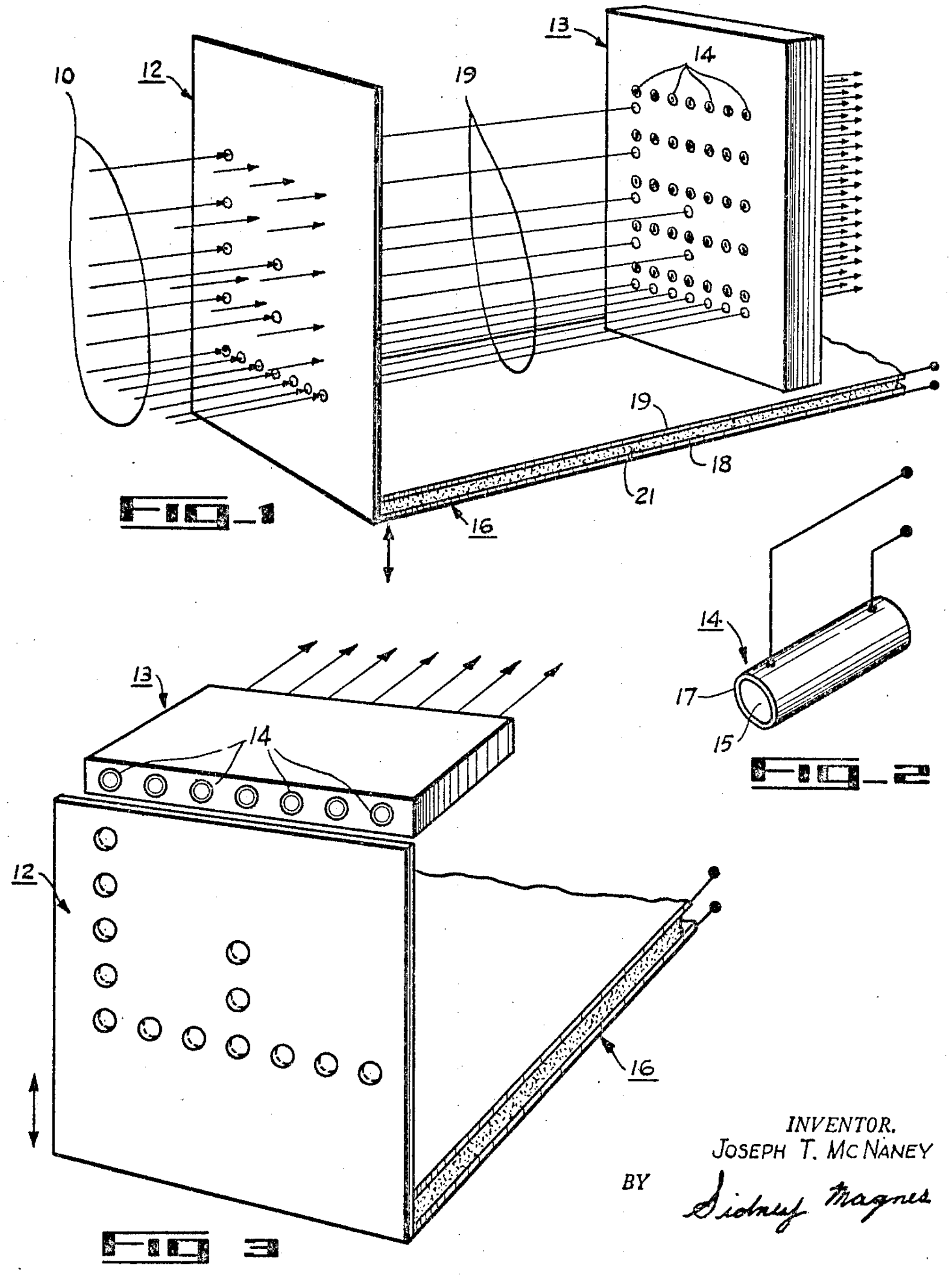
FIGURE 1 illustrates my inventive concept.
FIGURE 2 illustrates a useful component for use therewith.
FIGURES 3–9 illustrate other embodiments thereof.

This principle is used in FIGURE 1. Here a character or shadow mask 12 contains selected apertures of a 5 x 7 matrix; the apertures shown forming the letter "F" lying on its side. Character mask 12 may be a sheet of material having apertures, but I prefer an opaque film having transparent areas—since in this way the character may be extremely small, and have excellent resolution; while the mask can be extremely light weight.

Positioned behind character mask 12 is a pickup structure 13, comprising a plurality of pickup devices 14 arranged in a corresponding 5 x 7 matrix. These pickup devices produce electrical output signals when they are irradiated, and are preferably as small as possible. One exceedingly useful structure is shown in FIGURE 2. It comprises light guide 15 that is coated with a photoconductive material 17. When light enters light guide 15, the multiple internal reflections illuminate the inner surface of the circumjacent photoconductive sleeve 17. Its electrical resistance is thereby greatly reduced, and the flow of electricity therethru—resulting from the application of a potential applied to its terminals—produces an output signal. Light guides may be as small as .002 inch in diameter, in which case they are called optical fibers. In the pickup structure they may be mounted .005 inch apart and the resultant 5 x 7 pickup matrix 13 of FIGURE 1 may be smaller than .05 inch on each side.

Alternatively, the pickup devices may be photo-tubes, or dots of photoconductive material instead of the "clad" optical fibers 14; but the former requires more room, and the latter—because of the small area of the photoconductive material—does not produce as large an output signal. A pickup device comprising the photoconductor-clad optical fiber of FIGURE 2 produces a maximal output signal, while requiring a minimal space.

With character mask 12 normally positioned as shown in FIGURE 1, light rays 10 directed thereat traverse the apertures that form the character; and the emergent beams form a bundle 19 whose cross section corresponds to the pattern of apertures. Due to the relative positions of the mask and the pickup device, the emergent light beams impinge on non-responsive areas of the pickup structure; and no output is produced. When however, the mask is raised one half the distance between vertically adjacent pickup devices 14, the emergent light beams then impinge upon selected pickup devices. These thereupon produce output signals, whose utilization will be hereinafter discussed. Due to the tiny size of the character and the pickup structure, only a minute movement of the character mask is required to produce output signals.

In order to raise character mask 12, a positioning actuator 16 is used. This is preferably an electrostrictive device, whose mask-carrying end moves in response to an energizing signal. Devices of this type comprise a pair of electrodes 18 positioned contiguously on either side of a piezoelectric material 21 that changes its dimensions when energized; the overall structure 16 converting the dimensional change to linear movement of the free end. Electrostrictive actuators have the desirable property of producing the desired movement quickly, and with minimal excitation. Alternatively, other types of actuators can be used; as for example solenoids, magnestrostrictive devices, etc; but these are bulkier, and/or require greater excitation.

Thus, an assembly comprising a photographically produced character mask, a photoconductor-clad optical fiber, and an electrostrictive actuator provides a small, simple, reliable, data-providing assembly.

In operation, my invention uses a plurality of assemblies of the type shown in FIGURE 1, each having its own character formed on its mask. Since each pickup structure need be no more than .05" x .05", a hundred assemblies would fit into a .5" x .5" area, and the plurality if assemblies can therefore be exposed to a single light source. The output of the various pickup structures are connected in parallel, so that regardless of which assembly is energized, the output appears at an output terminal block. Thus, by energizing selective actuators, electrical output signals that correspond to predetermined characters are produced. (It will be hereinafter explained how an input signal comprising "two-bit" code can energize selected actuators.) Since each assembly "stores" a complete character; and the coded input signal retrieves the desired information on a single command without searching the entire memory—my invention thus provides composite information in a "random access" manner.

The electrical output signals may be used in the following manner. Each element of the output terminal block is connected to a correspondingly positioned unit of a 5 x 7 output matrix. The units of the output matrix, when energized by the signals from a pickup structure such as 13, produce an electrical recordation. This may be a charge pattern on a recording medium; a discoloration of a chemically treated paper; a deposition of material in a visible pattern; etc. The electrical recordation may then be converted to a visible display by a process such as electrostatic printing, or a suitable utilization device. The embodiment of FIGURE 1 thus produces complete characters; sequential characters being juxtaposed by suitable equipment.

The assembly of FIGURE 1 has the disadvantage that some of the pickup devices 14 are never used. This disadvantage is counterbalanced by the advantage that identical pickup structures 13 can be used on every assembly, regardless of the associated character; thus permitting mass production of the pickup structure—and further permitting the use of identical electrical connectors thereto.

One way of overcoming the above disadvantage is to use a pickup structure that has only those pickup devices that are necessary to produce the character associated with that assembly. In this arrangement, the mask need not have apertures arranged in the shape of the character, but requires only a single aperture to permit illumination of the pickup devices used.

Whereas the previously described embodiment provides an output that forms an entire character, FIGURE 3 shows an embodiment that produces fewer output signals—which are then synthesized to produce the desired composite character. The embodiment of FIGURE 3 is different, in that its pickup structure 13 comprises a single row of pickup devices 14, and an actuator 16 that causes mask 12 to move upwards a distance equal to the width of the character. Thus, during the movement of the mask, all its apertures move across the row of pickup devices, causing each device to produce a series of output signals. These may then be used to provide electrical recordations on a moving recording medium, in a manner similar to that explained above.

Figures 4, 5, 7:
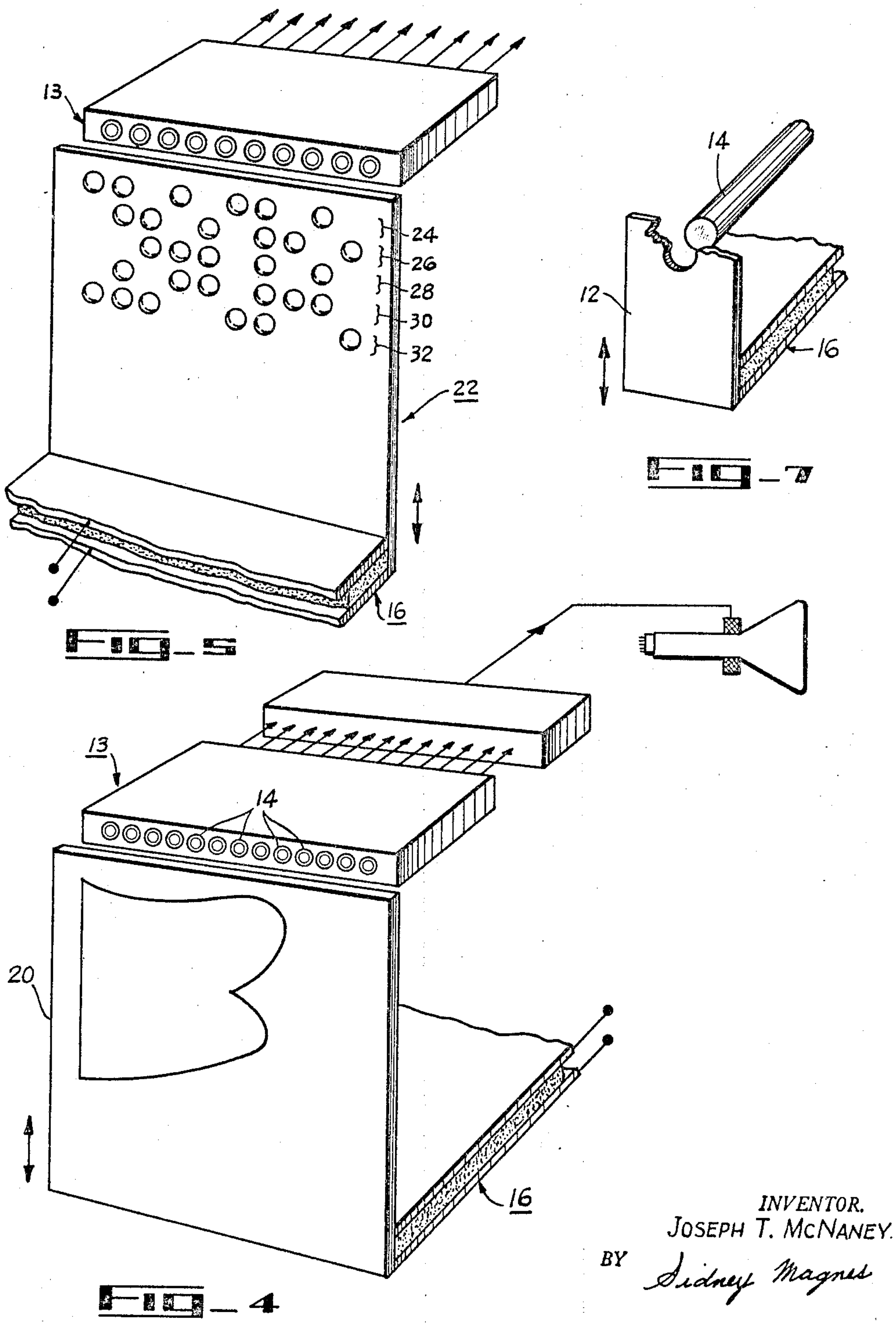

FIGURE 4 shows an embodiment wherein a mask 20, instead of having apertures arranged to correspond to a character, has a configuration that corresponds to a waveform. The waveform can alternatively be a transparent line on an opaque background; or an opaque or a transparent area on a contrasting background. As the mask is moved past pickup structure 13, pickup devices 14 provide output signals that are converted to an electrical recordation. Alternatively—as symbolically shown—the output signals may be applied to a cathode ray tube, and thus cause the electron beam thereof to trace out a corresponding pattern on the tube's faceplate. This approach to producing complex deflection waveforms for a cathode ray tube is much simplier than generating them electrically as has previously been done.

In FIGURE 5, mask 22 contains a series 24–32 of positioned apertures, each series corresponding to a ten-bit code. Suitable positioning of mask 22 causes the ten pickup devices of pickup structure 13 to produce an output. Thus, the embodiment of my invention shown in FIGURE 5 permits a two-bit input signal to trigger a chain of processes under the control of a ten-bit code.

Referring back to FIGURES 1, 3, 4, and 5, it may be seen that the character mask may be fixedly positioned, and the actuator can move an opaque or apertured shutter that exposes or shields the mask and/or pickup devices. Alternatively, the pickup structure itself can be mounted on the actuator.

Figures 6, 8, 9:
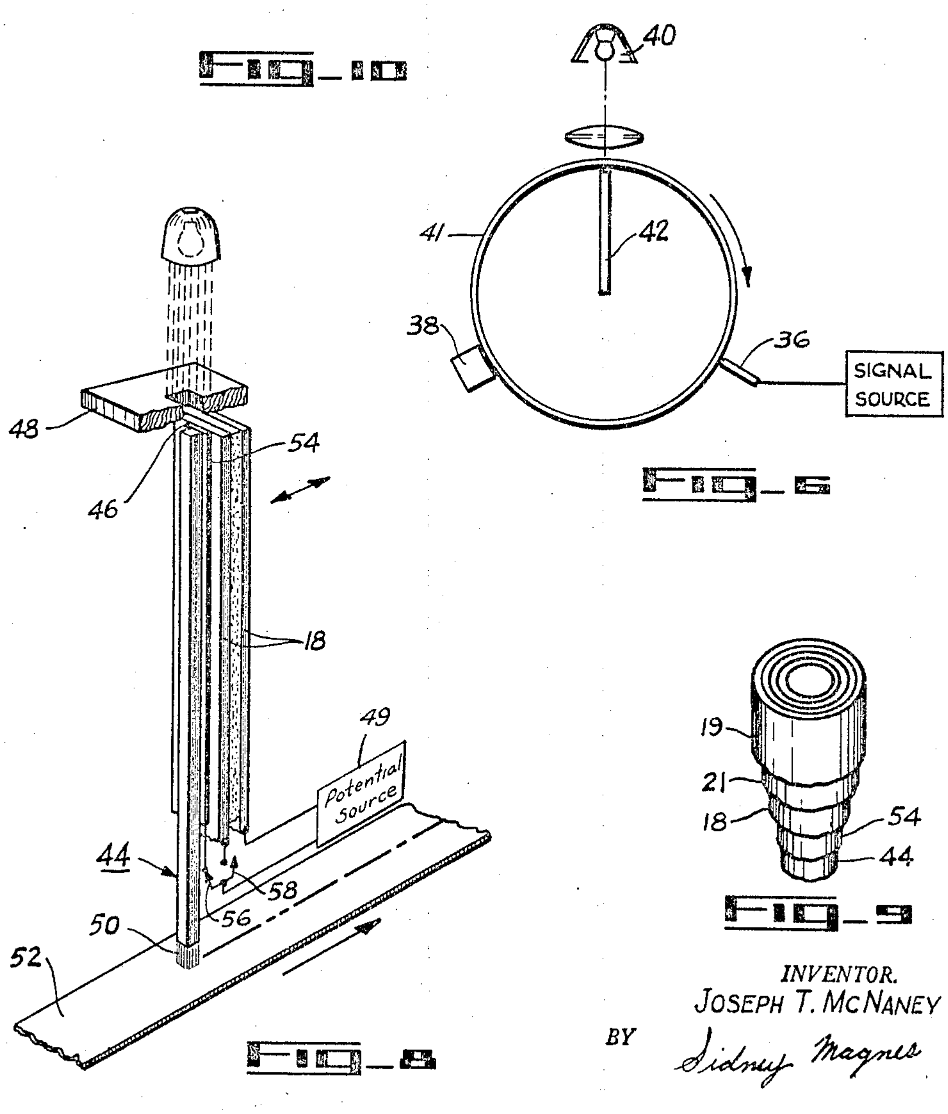

All the foregoing embodiments exhibit the property of random access; wherein any character, signal, or series of signals can be produced without searching through the entire memory. My invention is not limited to random access, however, as is shown in FIGURE 6. Here the memory system is one wherein the data is stored on a continuous surface, such as a drum or on a continuous loop of material. Permanent data can be stored by photographic or electrostatic printing, or any other method; and transient data can be stored, erased, and replaced by newer information as desired.

Electrostatic printing apparatus may be used as symbolically shown, wherein the data is recorded by probe 36, and the stored data is made visible by developer 38. Light from source 40, traversing the transparent areas, selectively illuminates pickup structure 42, whose output signals are then used as previously described. For a more complete description, reference may be had to the description associated with FIG. 3 wherein mask 12 connected corresponds to electrostatic recording medium 41 upon which the developed image is created. Pickup structure 42 of FIG. 6 corresponds with pickup structure 13 of FIG. 3. In this embodiment of my inventiin, the relative motion between the transparent areas of the recording medium and pickup structure 42 is provided by the continuous rotation of the recording medium. It is of course possible to reverse the positions of the light and the pickup structures; and to use a record medium wherein light is reflected from the data-bearing element, rather than being transmitted therethrough.

Where desired, my invention can provide output signals that are light, rather than electrical signals. To achieve this result, the pickup device shown in FIGURE 2 has its photoconductive sleeve 17 either eliminated or left unconnected. Referring back to FIGURES 1, 3, 4, and 5, it will be seen that under these conditions the light beams 19 that emerge from the apertures of the mask enter the light guides, and produce a corresponding visible pattern at the output end of the pickup structure. The output of the various assemblies are "connected" in parallel, and the output signals then appear at the output matrix; from where the light may be projected onto a film, a recording medium, a viewing screen, etc.

My invention readily lends itself to the solution of two other problems; namely the "shuttering," and the "modulation" of light beams. In shuttering it is desired to quickly produce or extinguish light beams; while in modulation, the intensity of the light beams is quickly varied.

In the past, several approaches have been used. One involved mechanical irises; but these tend to be slow, and involved complex linkages. Other approaches used electrical signals applied to Kerr cells; but these required high voltages. A third approach used flashing lights; the circuitry therefor tended to be complex. Moreover, in all the above methods the shuttering was gradual, rather than instantaneous; and the modulation was slow.

The embodiment of my invention shown in FIGURE 7 acts as a high-speed light shutter or light modulator. In this drawing, an actuator 16—preferably electrostrictive for the reasons hereinbefore discussed—has a free end that moves as indicated by the double ended arrow. Actuator 16 carries a mask having a single aperture; and a single pickup device 14 is used. Whereas the aperture is shown as an opening through a sheet of material, it is preferably a transparent area in an opaque material for the reasons previously discussed. By suitably positioning the aperture, the light guide and the aperture are alined; and light traverses the aperture and enters the pickup device. Since the pickup device and the aperture may both be of extremely small cross section, only a minute movement is required to dis-aline them; thus permitting very rapid and complete shuttering.

When the apparatus is to be used for light modulation, the light guide and the aperture is made larger; so that relative movement reduces the transmitted light, rather than shutting it off completely.

In the embodiment of FIGURE 8, the pickup device is mounted on the actuator while the mask remains fixed; the pickup device taking the form of a light guide 44, whose input end 46 is alinable with the aperture of mask 48. When the device is in its alined state, light traverses the aperture to enter the input end 46 of the light guide, and is emitted at the output end 50. There it impinges on a record medium 52, which may be—for example—a photographic film. As actuator 16 is energized in accordance with input signals, end 46 of the light guide moves to selectively transmit light to record medium 52, which is thereupon exposed in a dot-dash manner as symbolically shown.

The single light guides of FIGURES 7 and 8 record in a single-line dot-dash manner, while a plurality of light guides—as shown in FIGURE 3—produce a plurality of dots or lines that form characters on a moving record medium. The pickup structure of FIGURE 1, on the other hand, directly produces complete characters; while the pickup devices of FIGURE 4 of course produce a waveform.

If desired, the light guide of FIGURE 8 can produce an electrical signal by using the photoconductive sleeve upon light guide 44 as previously described with reference to FIG. 2 whereupon recording medium 52 would be a strip of electrically responsive material.

Light guide 44 is shown as being attached to the actuator; but it may take other forms. In some cases it may be imbedded in the actuator; and in other cases the actuator may be a hollow tube, with the light guide positioned therein.

The embodiment shown in FIGURE 8 can also provide "storage," or "memory"; that is maintain its energized state after the removal of a transient signal. This result is accomplished by the use of a photoconductor 54 positioned between light guide 44 and electrode 18. To achieve storage, switch 56 is closed, and a transient signal applied by momentarily closing switch 58. This momentarily connects potential source 49 across the actuator and the device is thus energized to produce alinement. Light enters the light guide, and the leakage therefrom illuminates photoconductor 54; thus reducing its resistance. In this state, the photoconductor connects the actuator across potential source 49 through switch 46, even though switch 58 is open. The completed circuit maintains the energized state until switch 56 is opened.

While photoconductor 54 is shown as a strip, other configurations can be used. For example, as shown in FIGURE 9, light guide 44 is surrounded by photoconductor 54, which is contiguous with electrode 18. Electrostrictive material 21 is sandwiched between electrode 18 and electrode 19. Since the photoconductor surrounds the light guide, the leakage light is used in a more efficient manner. Under some conditions it may be desirable for the photoconductor to extend only partway along the length of the light guide. The structure of FIGURE 9 is of course a composite actuator, and signals are applied thereto in the manner previously described.

Figure 10:
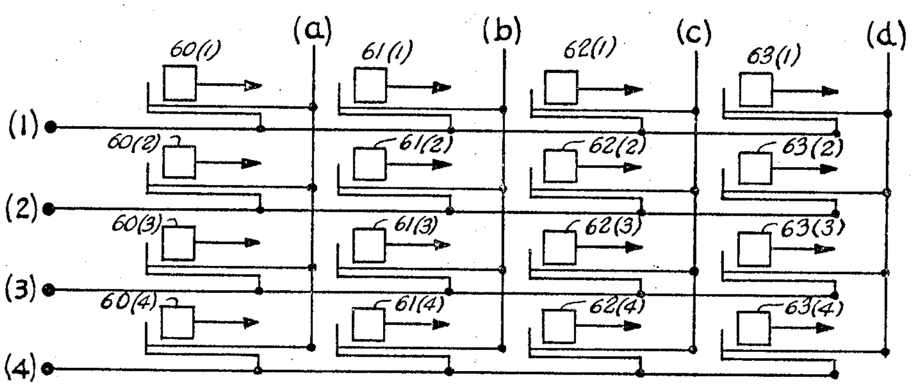
FIGURE 10 illustrates circuitry for energization.

FIGURE 10 shows circuitry whereby two-bit code signals may energize selected ones of actuators 60(1) . . . 60(4); 61(1) . . . 61(4); 62(1) . . . 62(4); and 63(1) . . . 64(4). Sixteen assemblies are symbolically shown by way of example, and the connections are such that a two-bit code (1,*a*) energizes only actuator 60(1), which thereupon produces its characteristic output signal. Similarly, a coded input signal applied to terminals (4) and (*d*) produces an output signal corresponding to the character associated with actuator 63(4). In this way a two-bit input signal can be used to produce the desired character, waveform, code, etc. associated with any given assembly.

The invention illustrated and described herein is illustrative only and the invention includes such other modifications and equivalents as may readily appear to those skilled in the art, within the scope of the appended claims.

The embodiments of the invention in which an exclusive property or privilege is claimed are defined as follows:

1. The combination comprising; a plurality of N radiation-responsive pickup means each of which comprises a plurality of pickup devices arranged in the form of a matrix of a given pattern, a plurality of N character masks each of which is individually associated with a particular one of said pickup means and each of which has a distinctive pattern of areas representative of particular information, each of said areas being transparent to incident radiation, each of said distinctive patterns corresponding with a particular portion of said given pattern; means for projecting radiation through transparent areas of each of said character masks towards the associated pickup means; a plurality of N means, each of which is individually associated with a particular character mask and its associated matrix, for positioning the mask and associated matrix in a first or second position relative to each other, said first position being such that the radiation pattern emerging from the mask does not impinge upon the pickup devices of the associated pickup means, said second position being such that the radiation pattern emerging from the mask impinges upon correspondingly positioned pickup devices of the associated pickup means, each of said positioning means being in said first position when unenergized, said positioning means assuming said second position on energization; and means for selectively energizing individual ones of said N positioning means, each of said positioning means comprising an electrostrictive material, and means connected to said selected energizing means for applying energizing potentials across said electrostrictive material, each of said character masks being supported for movement in response to movement of said electrostrictive material.

2. The combination comprising: a plurality of N radiation-responsive pickup means each of which comprises a plurality of pickup devices arranged in the form of a matrix of a given pattern, said pickup devices each having output terminals and responsive to incident radiation to generate signals on said output terminals, means for connecting in common output terminals of correspondingly positioned devices of each pickup means, said pickup devices each comprising optical fibers clad with a photoconductive material, said output terminal being connected to spaced points upon said photoconductive material, a plurality of N character masks each of which is individually associated with a particular one of said pickup means and each of which has a distinctive pattern of areas representative of particular information, each of said areas being transparent to incident radiation, each of said distinctive patterns corresponding with a particular portion of said given pattern; means for projecting radiation through transparent areas of each of said character masks towards the associated pickup means; a plurality of N means, each of which is individually associated with a particular character mask and its associated matrix, for positioning the mask and associated matrix in a first or second position relative to each other, said first position being such that the radiation pattern emerging from the mask does not impinge upon the pickup devices of the associated pickup means, said second position being such that the radiation pattern emerging from the mask impinges upon correspondingly positioned pickup devices of the associated pickup means, each of said positioning means being in said first position when unenergized, said positioning means assuming said second position on energization; and means for selectively energizing individual ones of said N positioning means.

References Cited in the file of this patent

UNITED STATES PATENTS

| | | |
|---|---|---|
| 1,907,124 | Ruben | May 2, 1933 |
| 2,285,296 | Maul | June 2, 1942 |
| 2,586,609 | Burke | Feb. 19, 1952 |
| 2,623,165 | Mueller et al. | Dec. 23, 1952 |
| 2,714,841 | Demer et al. | Aug. 9, 1955 |
| 2,723,308 | Vroom | Nov. 8, 1955 |
| 2,773,992 | Ullery | Dec. 11, 1956 |
| 3,011,061 | Dickinson | Nov. 28, 1961 |